UNITED STATES PATENT OFFICE.

ADOLPH BAEYER, OF MUNICH, BAVARIA, ASSIGNOR TO BADISCHE ANILIN AND SODA FABRIK, OF MANNHEIM, GERMANY.

MANUFACTURE OF ARTIFICIAL INDIGO.

SPECIFICATION forming part of Letters Patent No. 251,499, dated December 27, 1881.

Application filed September 29, 1881. (Specimens.)

*To all whom it may concern:*

Be it known that I, ADOLPH BAEYER, a subject of the King of Bavaria, residing at Munich, in the Kingdom of Bavaria and Empire of Germany, have invented new and useful Improvements in the Preparation of a New Material for the Manufacture of Artificial Indigo, of which the following is a specification.

This invention relates to the preparation of orthonitroacetenyl benzine—a material intended to be used in the manufacture of an artificial indigo-blue.

As an example of the manner in which my invention may be carried into effect, I proceed as follows: I mix one part, by weight, of orthonitrophenylpropiolic acid with about one hundred parts of water. I then submit the said mixture to a distillation with steam, whereby the said orthonitrophenylpropiolic acid gets decomposed into carbonic acid and into orthonitroacetenyl benzine. The latter compound distills over with the aqueous vapors, and condenses upon cooling in a solid crystalline condition. I then separate the orthonitroacetenyl benzine thus produced from the condensed water by filtering and drying.

Some of the characteristic properties of orthonitroacetenyl benzine produced as above described are as follows: It is soluble in alcohol, ether, benzine, and sparingly soluble in water. Boiled with a solution of bisulphite of ammonium it gradually dissolves with the production of a new sulpho-acid, which will be made the subject-matter of a later application for Letters Patent. The said sulpho-acid is capable of being converted into an artifical indigo-blue upon being boiled with concentrated muriatic acid, or upon being treated in the cold with alkaline reducing agents, such as zinc-dust and ammonia. Orthonitroacetenyl benzine mixed in alcoholic solution with an ammoniacal solution of cuprous chloride is changed into a characteristic copper compound possessing a bright-red color.

What I claim as new, and desire to secure by Letters Patent, is—

As a new article of manufacture, the orthonitroacetenyl benzine hereinbefore described, and having the characteristics above stated.

In testimony whereof I have hereunto set my hand in the presence of two subscribing witnesses.

ADOLPH BAEYER.

Witnesses:
PAUL FRIEDLAENDER,
LUDVIG LUNDSBERG.